United States Patent [19]

Murano et al.

[11] 4,347,617
[45] Aug. 31, 1982

[54] ASYNCHRONOUS TRANSMISSION SYSTEM FOR BINARY-CODED INFORMATION

[75] Inventors: Kazuo Murano, Tokyo; Kazuo Yamaguchi, Hiratsuka; Norio Murakami, Yokohama; Toshitaka Tsuda, Kawasaki, all of Japan

[73] Assignee: Fujitsu Limited, Kawasaki, Japan

[21] Appl. No.: 210,850

[22] Filed: Nov. 26, 1980

[30] Foreign Application Priority Data

Nov. 27, 1979 [JP] Japan ................... 54/153403
Nov. 30, 1979 [JP] Japan ................... 54/155009
Nov. 30, 1979 [JP] Japan ................... 54/155010

[51] Int. Cl.³ .............................. H03K 5/26
[52] U.S. Cl. ........................ 375/22; 375/37; 455/608; 307/234; 328/112
[58] Field of Search ............... 455/608; 375/17, 22, 375/26, 27, 37; 370/53; 340/825.63, 870.24; 307/234; 328/112

[56] References Cited

U.S. PATENT DOCUMENTS

3,993,954 11/1976 Sugai ........................... 375/22
4,027,152 5/1977 Brown et al. .................. 455/608

*Primary Examiner*—Jin F. Ng
*Attorney, Agent, or Firm*—Staas & Halsey

[57] ABSTRACT

An asynchronous transmission system for binary-coded information is disclosed. According to this system, in a transmitting terminal (A), when successive data of the same code in a set of asynchronous data lasts for a predetermined period of time ($T_1$), a refresh pulse, the polarity of which is opposite to that of the successive data, is added to a transmission signal. However, the addition of such a refresh pulse to the transmission signal is inhibited for a predetermined period of time ($T_2$) to allow for a change of data. In a receiving terminal (B), a pulse, the width of which is larger or equal to a minimum period of data, and a pulse, the width of which is smaller than or equal to a pulse-width ($T_0$) of a refresh pulse, can be discriminated and removed by a pulse-width discrimination circuit. As a result, the refresh pulse is not present in the output signal of the pulse-width discrimination circuit. Thus, the original asynchronous data is restored.

8 Claims, 61 Drawing Figures

ASYNCHRONOUS TRANSMISSION SYSTEM FOR BINARY-CODED INFORMATION

BACKGROUND OF THE INVENTION

The present invention relates generally to a communication system and, more particularly, to an asynchronous transmission system for binary-coded information.

Generally in systems for transmitting binary-coded information, there are two types of transmission systems: synchronous transmission systems, and asynchronous transmission systems. According to the synchronous transmission system, a transmission signal is in synchronization with a clock. Usually, continuation of a signal having the same polarity is restricted by scrambling the signal or by encoding a transmission line. Because of the clock signal of the synchronous transmission system the mark density of the transmission line is almost 50 percent. Therefore, the average level (direct-current level) of the transmission signal is almost constant and a data signal of each polarity appears at least one time for a certain period of time, which facilitates stable automatic gain control (AGC) in a receiving terminal and monitoring in a transmission line. However, in the asynchronous transmission system, the 50% mark density and the restriction of continuation of the same polarity signal cannot be expected. Therefore, if the data to be transmitted comprises successive data of the same code "0" or "1", the transmission signal includes a direct-current component. As a result, the average level of the transmission signal fluctuates greatly, so that AGC in a receiving terminal is difficult and, in addition, monitoring the transmission line is difficult. In addition, if the data includes successive data of the same code such as "0", it is difficult to discriminate an interruption of the transmission line from the successive data "0".

According to one conventional asynchronous transmission system, in a transmitting terminal, asynchronous data is synchronized by using sampling pulses so that the signal is converted into a RZ (Return to Zero) coded signal or other coded signal. As a result, the direct-current component of the transmission line current is diminished. However, the conventional asynchronous system requires a complex electrical structure for the transmitting and receiving terminals.

According to another conventional asynchronous transmission system for binary-coded information, in a transmitting terminal, a pulse is generated at each transition of a signal and in addition, if there are no changes in the level of the binary-coded signal for a predetermined period of time, a refresh pulse is added to the pulse-coded signal so as to diminish the direct-current component of the transmission line current. In more detail, for example, when the binary-coded signal is changed from the "0" level to the "1" level, a positive-going pulse is generated. Similarly, when the binary-coded signal is changed from the "1" level to the "0" level, a negative-going pulse is generated. In addition, if there are no changes in the level of the binary-coded signal for a predetermined period of time, a refresh pulse, the polarity of which is the same as that of the last generated pulse, is generated. Therefore, there are three levels for the pulse-coded signal: a negative voltage, an off-condition level and a positive voltage in the case where the pulse-coded signal is electrical. In particular, in the case where the pulse-coded signal is optical, the three levels thereof correspond to an off-condition level, about a half brightness level and a full brightness level (see: U.S. Pat. No. 4,027,152).

However, the last-mentioned conventional system has the following disadvantages.

(1) The transmitting terminal is complex in electrical structure, since the transmitting terminal must generate the three levels of electrical or optical signals. Simultaneously, the receiving terminal is also complex in electrical structure, since the receiving terminal must discriminate between the three levels.

(2) In the case where the pulse-coded signal is optical, the operation of the transmitting and receiving terminals is performed for half of the full brightness, so that the margin of operation of the circuits used for the system becomes small.

(3) A refresh pulse may be added to the pulse-coded signal directly even before a change thereof, so that the transmission rate of the pulse-coded signal becomes substantially larger than the maximum transmission rate of the transmission line. As a result, data transition may be extinguished which creates a high possibility for the generation of data errors.

SUMMARY OF THE INVENTION

It is an object of the present invention to provide an asynchronous transmission system for binary-coded information comprised of simple electrically structured circuits.

It is another object of the present invention to provide an asynchronous transmission system for binary-coded information with a large margin of operation in the case where a transmission line is comprised of a fiber-optic cable.

It is still another object of the present invention to provide an asynchronous system for binary-coded information with a small possibility of generation of errors.

According to the present invention, there is provided an asynchronous transmission system for binary-coded information including: a first means for receiving a binary-coded signal and means, connected to the first receiving means, for delaying the binary-coded signal. The transmission system also includes means connected to the receiving means and to the delaying means, for generating refresh pulses after a period of successive data of the same code in the delayed binary-coded signal are received for a predetermined period of time and before a next change in the binary-coded signal is received, the pulse width of the refresh pulses being smaller than a minimum period of data. The transmission system additionally includes, means, connected to the delaying means and to the refresh pulse generating means, for combining the delayed binary-coded signal with the refresh pulses, the polarity of which is opposite to that of the delayed binary-coded signal and means connected to the combining means, for transmitting the combined signal. The transmission system also includes a second means for receiving the transmitted signal and a pulse-width discriminating means, connected to the second receiving means, for transmitting the received signal, from which the refresh pulses have been excluded, received by the second receiving means, whereby the binary-coded signal is restored.

The present invention will be more clearly understood from the description as set forth below contrasting the present invention with the conventional system and with reference to the accompanying drawings.

BRIEF DESCRIPTION OF THE DRAWINGS

FIGS. 1(1), 1(2) and 1(3) are timing diagrams for explaining the principle of one conventional asynchronous transmission system for binary-coded information;

FIGS. 2(1), 2(2) and 2(3) are timing diagrams for explaining the principle of the asynchronous transmission system according to the present invention;

FIGS. 4(1) through 4(9) are timing diagrams of the signals appearing in the circuit of FIG. 3;

FIGS. 6(1) through 6(6) are timing diagrams of the signals appearing in the circuit of FIG. 5;

FIGS. 8(1a) through 8(14a) and 8(1b) through 8(14b) are timing diagrams of the signals appearing in the circuit of FIG. 7;

FIGS. 10(1) through 10(8) are timing diagrams of the signals appearing in the circuit of FIG. 9.

DESCRIPTION OF THE PREFERRED EMBODIMENT

Referring to FIGS. 1(1), 1(2) and 1(3) which illustrate the principle of one conventional asynchronous transmission system of binary-coded information (see: U.S. Pat. No. 4,027,127), asynchronous data, as illustrated in FIG. 1(1) is, converted into a pulse-coded signal as illustrated in FIG. 1(2). That is, a positive-going pulse is generated at a "0" to "1" transition of the asynchronous data, while a negative-going pulse is generated at a "1" to "0" transition of the asychronous data. In addition, when successive data of the same code last for a period of time $T_1$, a refresh pulse, the polarity of which is the same as that of the last generated pulse, is added to the pulse-coded signal. In this case, the period $T_1$ is much larger than a minimum period T of data. Therefore, as illustrated in FIG. 1(2), the pulse-coded signal includes a larger alternating-current component as compared with the asynchronous data signal of FIG. 1(1). In FIG. 1(2), the level "½" indicates a quiescent level. For example, if the levels of FIG. 1(2) are electrical levels, the "0", "½" and "1" levels correspond to negative voltage, zero voltage and positive voltage levels, respectively. On the other hand, if the levels of FIG. 1(2) are optical levels, the "0", "½" and "1" levels correspond to off-condition, half brightness and full brightness levels, respectively. In a receiving terminal, such an optical signal is converted into an electrical signal, so that the peak values of pulses included therein are compared with two threshold values. As a result, asynchronous data as illustrated in FIG. 1(3) is restored. However, in the transmitting terminal, a circuit for converting the signal waveform of FIG. 1(1) into the signal waveform of FIG. 1(2) is complex, while, in the receiving terminal, a circuit for discriminating the peak values of pulses included in the signal waveform of FIG. 1(2) must be provided. In addition, when the transmission line is comprised of a fiber-optic cable, it is necessary to discriminate half the full brightness from the full brightness or the off-condition, so that the margin of operation of the circuits used for the system is relatively small.

Further, a refresh pulse may be added to the pulse-coded signal just before the change thereof, which increases the frequency of the pulse-coded signal substantially. As a result, the transmission frequency may exceed the frequency bandwidth of the transmission line. When the bandwidth is exceeded the transmission of data is extinguished, so that the data is erroneous.

FIGS. 2(1), 2(2) and 2(3) are timing diagrams for illustrating the principle of the asynchronous transmission system for binary-coded information according to the present invention. FIG. 2(1) indicates asynchronous data, while FIG. 2(2) indicates a transmission data signal. When successive data of the same code in the asynchronous data of FIG. 2(1) lasts for a period $T_1$ of time, a refresh pulse, the pulse-width of which is $T_0$, is inserted in the transmission signal as illustrated in FIG. 2(2). In this case, the polarity of the refresh pulse is opposite to that of the successive data. That is, the waveform of FIG. 2(1) is the same as that of FIG. 2(2), except for the refresh pulses. Transformation from the waveform of FIG. 2(1) into the waveform of FIG. 2(2) can be effected easily by a simple circuit, as will be explained. It should be noted that no refresh pulses are added within a period $T_2$ of time before the change of the asynchronous data. Therefore, the minimum pulse-width of the transmission signal is $T_0$, in other words, the maximum transmission rate is $1/T_0$. If this maximum rate is within the range of the bandwidth of the transmission line, transmission data is not extinguished during transmission. In a receiving terminal, a circuit for discriminating the pulse-width of refresh pulses from other waveforms is provided, so as to remove refresh pulses included in the transmission signal of FIG. 2(2). As a result, asynchronous data as illustrated in FIG. 2(3), which is the same as the data of FIG. 1(1), is restored. Such a discrimination circuit is simple, as will be explained in more detail. Further, if the transmission line comprises a fiber-optic cable, the "0" and "1" levels correspond to the off-condition and full brightness level, so as to increase the margin of operation of the circuits used for the transmission system.

Figure 1:
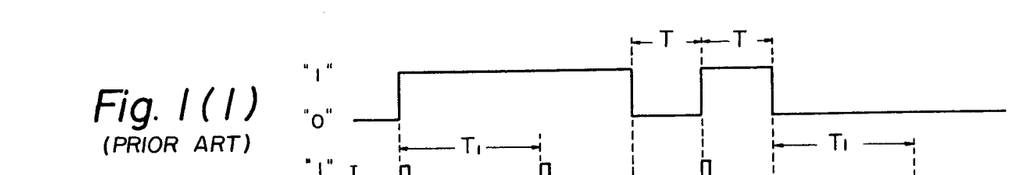
Figure 2:
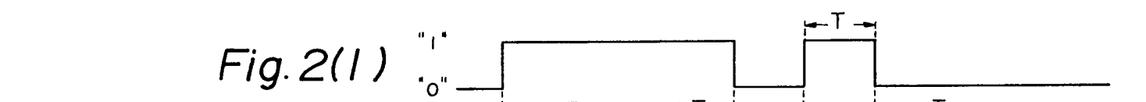
Figure 3:
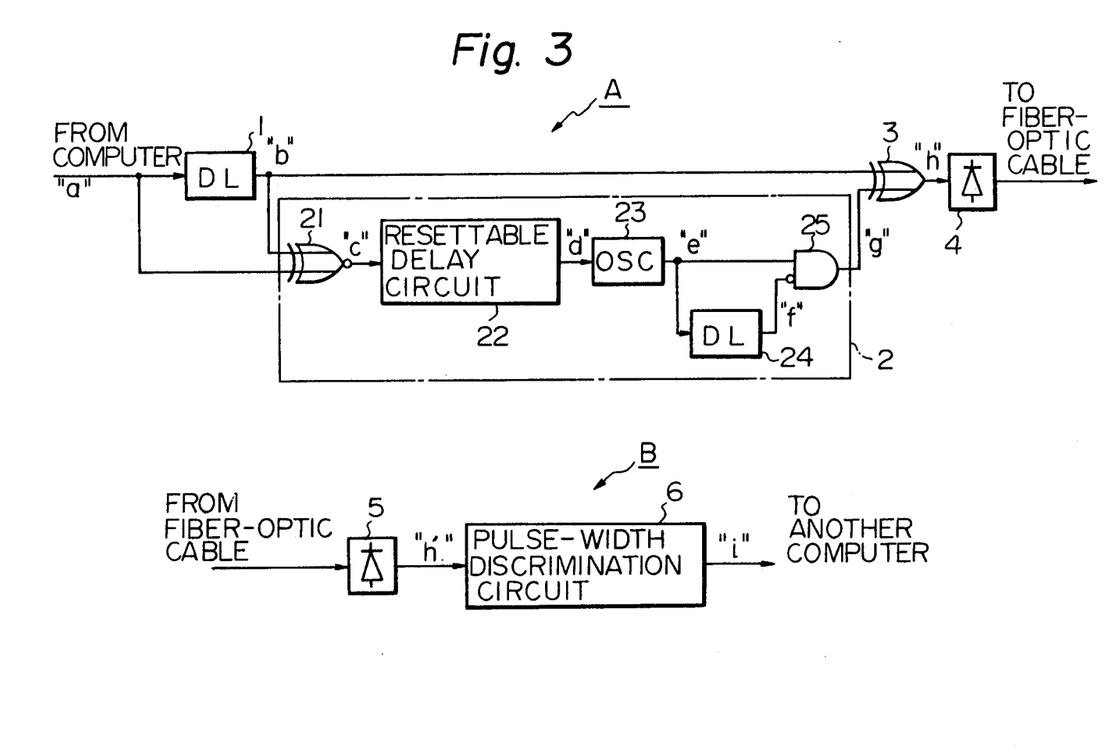
FIG. 3 is a block diagram illustrating an embodiment of the asynchronous transmission system according to the present invention.
Figure 4:
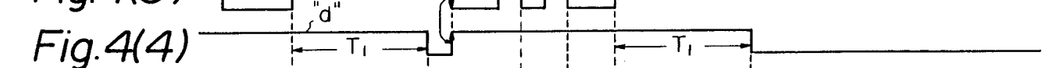

FIG. 3 is a block diagram illustrating an embodiment of the asynchronous transmission system for binary-coded information according to the present invention. In FIG. 3, a transmitting terminal is indicated by A, while a receiving terminal is indicated by B. In the transmitting terminal A, a binary-coded signal "a", which is generated by a computer or other device and received by a receiving device (not shown), is supplied to a delay circuit 1 having a delay time $T_2$ and a refresh pulse generating circuit 2. An output signal "b" of the delay circuit 1 is supplied to the refresh pulse generating circuit 2 and to an exclusive OR circuit 3 which also receives a refresh pulse signal "g" from the refresh pulse generating circuit 2. The exclusive OR circuit 3, which serves as device for combining the refresh pulse signal "g" with the output signal "b" from the delay circuit 1, activates a transmitting circuit 4 including a light-emitting diode (LED). As a result, an output signal "h" is converted into an optical signal by the transmitting circuit 4 and the optical signal is transmitted through a fiber-optic cable to the receiving terminal B.

In the receiving terminal B, the optical signal from the fiber-optic cable is received by a receiving circuit 5 including a photodiode which, in turn, generates an electrical signal "h'". The signal "h'" is normally the same as the signal "h" of the transmitting terminal. Next, the signal "h'" is supplied to a pulse-width discrimination circuit 6, in which pulses, the pulse-width of which is less than or equal to than $T_0$, are neglected regardless of the polarity thereof. As a result, a signal "i", which is the same as the binary-coded signal "a", is restored and transmitted to another computer or the like.

FIGS. 4(1) through 4(9) are timing diagrams of the signals appearing in the circuit of FIG. 3. Referring to FIGS. 4(1) through 4(9), the circuit of FIG. 3 will now be explained in more detail. The binary-coded signal "a" as illustrated in FIG. 4(1) is delayed for a period of time $T_2$ by the delay circuit 1 which, in turn, generates the signal "b" as illustrated in FIG. 4(2).

In the refresh pulse generating circuit 2, the signal "a" of FIG. 1(1) and the signal "b" are supplied to an exclusive NOR circuit 21 serving as a coincidence device which, in turn, generates a signal "c" as illustrated, in FIG. 4(3). In this case, when the polarities of the signals "a" an "b" are the same, the polarity of the signal "c" is high, when the polarities of the signals "a" and "b" are different, the polarity of the signal "c" is low. Next, the signal "c" is supplied to a resettable delay circuit 22 for monitoring the high polarity of the signal "c". If the high polarity of the signal "c" lasts for a predetermined period of time $T_1$, the resettable delay circuit 22 is reset. In addition, the resettable delay circuit 22 is set by leading edges of the signal "c". In other words, the resettable delay circuit 22 is used for monitoring the duration of the high or low polarity of the signal "b". That is, when the high or low polarity of the signal "b" lasts for the period $T_1$, the resettable delay circuit 22 is reset. In addition, when the polarity of the signal "a" is changed, the resettable delay circuit 22 is set.

When the resettable delay circuit 22 is reset, that is, when the polarity of a signal "d" as illustrated in FIG. 4(4) falls, an oscillator 23 is triggered so as to generate a rectangular signal "e" of a definite frequency as illustrated in FIG. 4(5). Further, the rectangular signal "e" is delayed for a period of time $T_0$ by a delay circuit 24 which, in turn generates a signal "f" as illustrated in FIG. 4(6). The signal "f" is supplied to an inhibit input of an inhibition gate circuit 25, the data input of which receives the signal "e". As a result, the inhibition gate circuit 25 generates the refresh pulse signal "g", the pulse-width of which is $T_0$, as illustrated in FIG. 4(7).

Here, it should be noted that, the oscillator 23 cannot generate refresh pulses from the time t to the time $t+T_2$, since the resettable delay circuit 22 is set at the time t. That is, no refresh pulses are generated for a period of time $T_2$ before the change of the signal "b".

Next, the refresh pulse signal "g" is supplied to the exclusive OR circuit 3 which, in turn, combines the refresh pulses with the signal "b" of FIG. 4(2) so as to generate the transmission signal "h" as illustrated in FIG. 4(8). Of course, as mentioned above, there is no refresh pulse for a period of time $T_2$ before the change of the signal "b". Accordingly, the transmission signal "h" includes no pulses the pulse-width of which is smaller than $T_0$. As a result, if the transmission line, such as a fiber-optic cable, is so designed as to have a lower transmission rate than $1/T_0$, the data of the transmission signal "h" is not changed during transmission.

It should be noted that a resettable delay line can be used as an oscillator by the feedback of the signal "f" as a set pulse. In this case, the oscillator 23 can be omitted.

Next, the transmission signal "h" is transmitted from the transmitting circuit 4 through the fiber-optic cable to the receiving circuit 5 of the receiving terminal B. The output signal "h'" of the receiving circuit 5 is delayed for a period of time $T_3$ by the pulse-width discrimination circuit 6. In addition, the circuit 6 ignores pulses the pulse-width of which are smaller than or equal to $T_0$ so as to generate the signal "i" as illustrated in FIG. 4(9). Thus, the signal "a", as illustrated in FIG. 4(1) is restored in the receiving terminal B.

The above-mentioned period $T_2$ satisfies the condition: $T_2 < 2T$ where the period $T$ is a minimum period for asynchronous data. For example, $T_2$ is so designed as to be between $\frac{2}{3}T$ and $2T$. In addition, the delay time $T_1$ of the resettable delay circuit 22 is so designed as to be in the range from $2T$ to $8T$.

Figure 5:
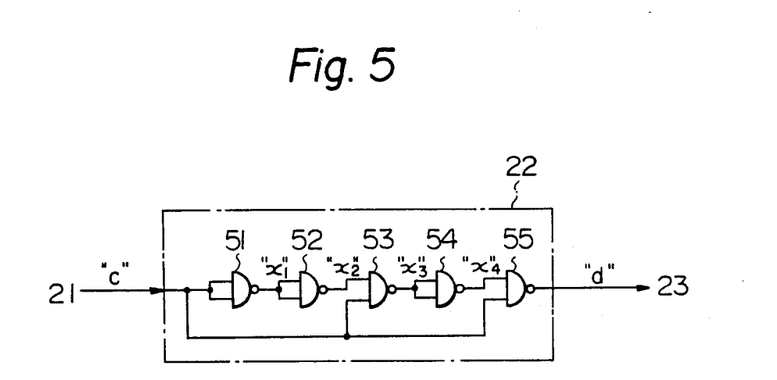
FIG. 5 is a circuit diagram of the resettable delay circuit 22 of FIG. 3.
Figure 6:
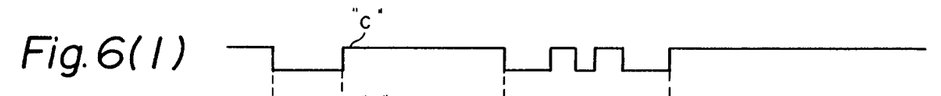

FIG. 5 is a circuit diagram of the resettable delay circuit 22 of FIG. 3. In FIG. 5, five NAND circuits 51, 52, ..., 55 are connected in series. The input signal "c" of the circuit 22 is supplied to only the third and last stages of the NAND circuits. Therefore, the other NAND circuits 51, 52 and 54 serve as inverter circuits. Here, a period $T_1$ is a total delay time of the NAND circuits. The operation of the circuit 22 will now be explained, in order to convert the signal "c" of FIG. 4(3) into the signal "d" of FIG. 4(4).

FIGS. 6(1) through 6(6) are timing diagrams of the signals appearing in the circuit of FIG. 5. Referring to FIGS. 6(1) through 6(6), a signal "c" (which is the same as the signal "c" of FIG. 4(3)) as illustrated in FIG. 6(1) is inverted and delayed for a period $\tau_1$ by the NAND circuit 51 which, in turn, generates a signal "$x_1$" as illustrated in FIG. 6(2). Similarly, the signal "$x_2$" is inverted and delayed for a period $\tau_1$ by the NAND circuit 52 which, in turn, generates a signal "$x_3$" as illustrated in FIG. 6(3). Next, a NAND logic operation is performed on the signal "c" of FIG. 6(1) and the signal "$x_2$" of FIG. 6(3) by the NAND circuit 53 which, in turn, generates a signal "$x_3$" as illustrated in FIG. 6(4). Further, the signal "$x_3$" is inverted and delayed for a period $\tau_1$ by the NAND circuit 54 which, in turn, generates a signal "$x_4$" as illustrated in FIG. 6(5). Finally, a NAND logic operation is performed on the signal "$x_4$" and the signal "c" of FIG. 6(1) by the NAND circuit 55 which, in turn, generates the signal "d" as illustrated in FIG. 6(6).

Thus, the resettable delay circuit 22 is reset by leading edges of the input signal "c", however, in this case, the reset operation is delayed for a period $T_1(=5\tau_1)$. On the other hand, the resettable delay circuit 22 is set immediately by trailing edges of the input signal "c"; however, in this case, the set operation is delayed for a period $\tau_1$ which is much smaller than $T_1$.

In FIG. 5, even if the output signal "$x_2$" of the NAND circuit 52 is supplied to both of the inputs of the NAND circuit 53, the output signal "d" of FIG. 6(6) can be obtained at the output of the NAND circuit 55. However, the reason why the input signal "c" is supplied to at least one intermediate stage of the NAND circuits is that the output signal from the circuit 22 is stopped by setting the intermediate state, even when an input signal including successive pulses, the pulse-width each of which is very small, is supplied to the circuit 22 so that the input signal coincides with the output signal of the last stage.

It should be noted that the resettable delay circuit 22 is comprised of an odd number of NAND circuits connected in series (in FIG. 5, five NAND circuits), so that the polarity of the input signal "c" is opposite to that of the output signal "d". In addition, the intermediate stage to which the input signal "c" is supplied is an odd stage of the NAND circuits (in FIG. 5, the third stage).

Figure 7:
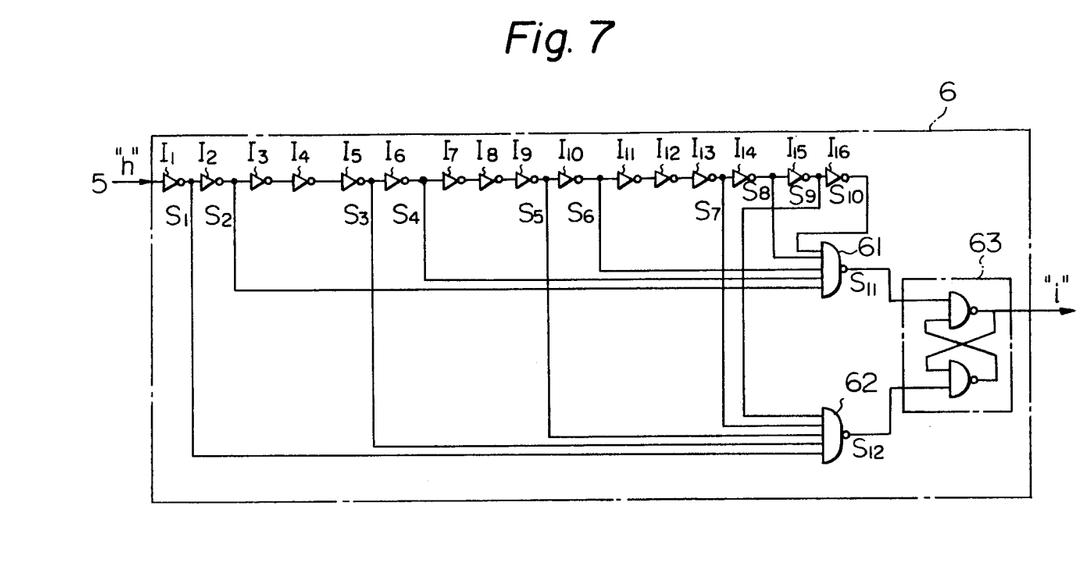
FIG. 7 is a circuit diagram of the pulse-width discrimination circuit 6 of FIG. 3.
Figure 8:
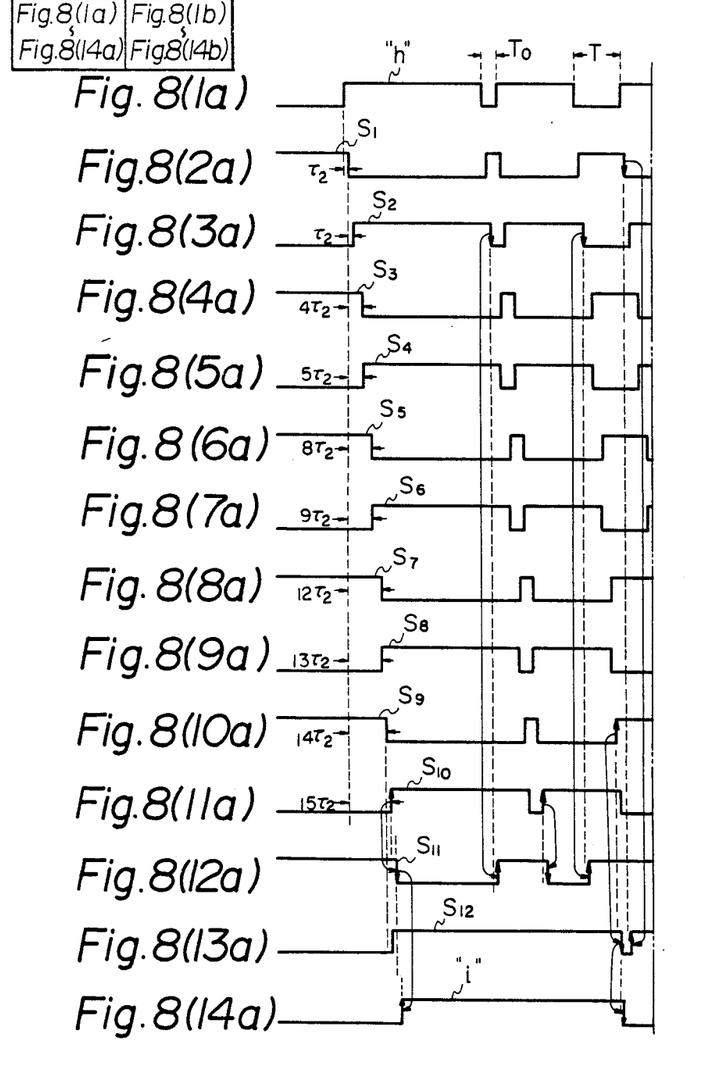

FIG. 7 is a circuit diagram of the pulse-width discrimination circuit of FIG. 3. In FIG. 7, a plurality of inverter circuits $I_1, I_2, \ldots, I_{16}$ are connected in series. In addition, output signals $S_2, S_4, S_6, S_8$ and $S_{10}$ of even inverter circuits, for example, the inverter $I_2, I_6, I_{10}, I_{14}$ and $I_{16}$ are supplied to a NAND circuit 61, while output signals $S_1, S_3, S_5, S_7$ and $S_9$ of odd inverter circuits, for example, the inverter circuits $I_1, I_5, I_9, I_{13}$ and $I_{15}$ are supplied to a NAND circuit 62. Further, outputs of the NAND circuits 61 and 62 are connected to a set input and a reset input, respectively of a flip-flop 63 constructed of two cross-coupled NAND circuits. $\tau_2$ is a delay period for each of the inverter circuits.

FIGS. 8(1), corresponding to 8(1a) and 8(1b) through 8(14), corresponding to 8(14a) and 8(14b), are timing diagrams of the signals appearing in the circuit of FIG. 7. Referring to FIGS. 8(1) through 8(14), the operation of the circuit of FIG. 7 will now be explained. FIG. 8(1) indicates the input signal "h". As illustrated in FIGS. 8(2) through 8(11), each of output signals $S_1$ through $S_{10}$ is delayed, as compared with the input signal "h", for a period which is dependent upon the stages of the inverter circuits. The output signals $S_2, S_4, S_6, S_8$ and $S_{10}$ have the same polarity as that of the input signal "h", while the output signals $S_1, S_3, S_5, S_7$ and $S_9$ have an opposite polarity to that of the input signal "h".

When all of the potentials of the signals $S_2, S_4, S_6, S_8$ and $S_{10}$ are high, the polarity of the output signal $S_{11}$ of the NAND circuit 61 is low. When at least one of the polarities of the signals $S_2, S_4, S_6, S_8$ and $S_{10}$ is low, the polarity of the signal $S_{11}$ is high. Therefore, as illustrated in FIG. 8(12), the polarity of the signal $S_{11}$ rises by trailing edges of the signal $S_2$ as illustrated in FIG. 8(3) and falls by leading edges of the signal $S_{10}$ as illustrated in FIG. 8(11). Similarly, as illustrated in FIG. 8(13), the polarity of the output signal $S_{12}$ of the NAND circuit 62 rises by trailing edges of the signal $S_1$ as illustrated in FIG. 8(2) and falls by leading edges of the signal $S_{10}$ as illustrated in FIG. 8(10).

When the polarity of a refresh pulse in the signal "h" is high, the polarity of the signal $S_{11}$ remains high, since all the polarities of the signals $S_2, S_4, S_6, S_8$ and $S_{10}$ cannot be high at one time. Therefore, the polarity of the set input of the flip-flop 63 remains high, and accordingly, the flip-flop 63 remains in a set state in which the polarity of the signal "i" is low. Thus, a refresh pulse having a high polarity is not present in the signal "i" as illustrated in FIG. 8(14).

When the polarity of a refresh pulse is low in the signal "h", the polarity of the signal $S_{12}$ is high, since all the polarities of the signals $S_1, S_3, S_5, S_7$ and $S_9$ cannot be low at one time. Therefore, the polarity of the reset input of the flip-flop 63 remains high, and, accordingly, the flip-flop 63 remains in a reset state in which the polarity of the signal "i" is high. Thus, a refresh pulse having a low polarity is also not present in the signal "i" as illustrated in FIG. 8(14).

It should be noted that the difference in time between the signals $S_2$ and $S_{10}$ (in this case, $14\tau_2$) is so designed as to be larger than $T_0$ and smaller than T, in order to exclude a refresh pulse of a high polarity from the signal "i" and to retain a data pulse having a minimum period T. Similarly, the difference in time between the signals $S_1$ and $S_9$ (in this case, $15\tau_2$) is so designed as to be larger than $T_0$ and smaller than T, in order to exclude a refresh pulse of a low polarity from the signal "i" and to retain a data pulse having a minimum period T.

Figure 9:
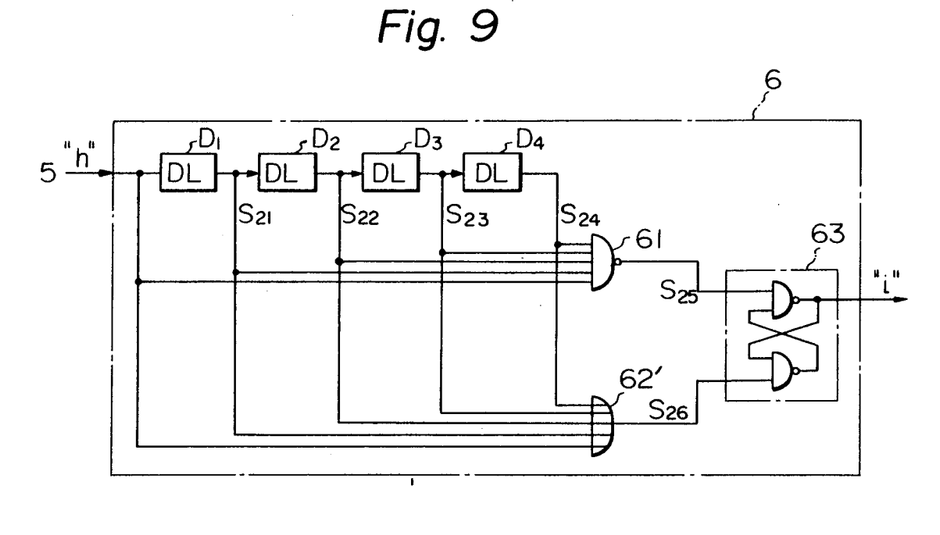
FIG. 9 is another circuit diagram of the pulse-width discrimination circuit 6 of FIG. 3.
Figure 10:
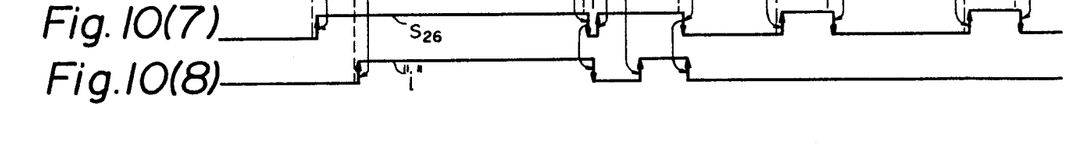

FIG. 9 is another circuit diagram of the pulse-width discrimination circuit 6 of FIG. 3. In FIG. 9, the elements which are the same as those of FIG. 7 are denoted by the same references. In FIG. 9, four delay circuits $D, D_2, D_3$ and $D_4$ are provided instead of the inverter circuits $I_1, I_2, \ldots, I_{16}$ of FIG. 7, and an OR circuit 62' is provided instead of the NAND circuit 62 of FIG. 7. $\tau_3$ is a delay time of each delay circuit.

FIGS. 10(1) through 10(8) are timing diagrams of the signals appearing in the circuit of FIG. 9. Referring to FIGS. 10(1) through 10(8), the operation of the circuit of FIG. 9 will now be explained. FIG. 10(1) indicates the input signal "h". As illustrated in FIGS. 10(2), 10(3), 10(4) and 10(5), output signals $S_{21}, S_{22}, S_{23}$ and $S_{24}$ of the delay circuits $D_1, D_2, D_3$ and $D_4$ are delayed, as compared with the signal "h", for periods $\tau_3, 2\tau_3, 3\tau_3$ and $4\tau_3$, respectively. In this case, the polarities of the signals $S_{21}, S_{22}, S_{23}$ and $S_{24}$ are the same as that of the signal "h".

When all of the polarities of the signals "h", $S_{21}, S_{22}, S_{23}$ and $S_{24}$ are high at the same time, the polarity of the output signal $S_{25}$ of the NAND circuit 61 is low. When at least one of the polarities of the signals "h", $S_{21}, S_{22}, S_{23}$ and $S_{24}$ is low, the polarity of the NAND circuit 61 is high. Therefore, as illustrated in FIG. 10(6), the polarity of the signal $S_{25}$ rises by trailing edges of the signal "h" as illustrated in FIG. 10(1) and falls by leading edges of the signal $S_{24}$ as illustrated in FIG. 10(5). Similarly, as illustrated in FIG. 10(7), the output signal $S_{26}$ of the OR circuit 62' rises by leading edges of the signal "h" as illustrated in FIG. 10(1) and falls by trailing edges of the signal $S_{24}$ as illustrated in FIG. 10(5).

When the polarity of a refresh pulse in the signal "h" is high, the polarity of the signal $S_{25}$ which is also the polarity of the set input of the flip-flop 63 remains high, but all the polarities of the signals "h", $S_{21}, S_{22}, S_{23}$ and $S_{24}$ cannot be high at one time. Therefore, the flip-flop 63 remains in a set state, so that the polarity of the signal "i" is low. Thus, a refresh pulse having a high polarity is not present in the signal "i" as illustrated in FIG. 10(8).

Similarly, when the polarity of a refresh pulse is present in the signal "h", a refresh pulse is not present in the signal "i" as illustrated in FIG. 10(8).

It should be noted that the difference in time between the signals "h" and $S_{24}$ is so designed as to be larger than $T_0$ and smaller than T, in order to exclude a refresh pulse from the signal "i" and retain a data pulse having a minimum period T.

In addition, in FIG. 3 the delay circuit 1 and the refresh pulse generating circuit 2 can be comprised of an integrated semiconductor device and, the pulse-width discrimination circuit 6 can also be comprised of an integrated semiconductor device.

As explained hereinbefore, the asynchronous transmission system for binary-coded information of the present invention has the following advantages, as compared with the conventional system.

(1) The circuits used for the system are simple, since such circuits are comprised of a simple resettable delay circuit, a simple pulse-width discrimination circuit or the like.

(2) The margin of operation of the circuits used for the system can be large, since a transmission signal includes only two levels. Therefore, in particular, if a fiber-optic cable is used as a transmission line, the two levels can correspond to the off-condition and the full brightness level.

(3) The possibility of generation of data errors during transmission is small, since no refresh pulses are included in a transmission signal for a predetermined period of time before a data transition, so that the transmission rate can be lower than a definite value.

What we claim is:

1. An asynchronous transmission system for binary coded information comprising:
   first receiving means for receiving a binary-coded signal;
   delaying means, operatively connected to said first receiving means, for delaying said binary-coded signal and for generating a delayed binary-coded signal;
   refresh pulse generating means, operatively connected to said first receiving means and to said delaying means, for generating refresh pulses after a period of successive data of the same code in said delayed binary-coded signal are received for a predetermined period of time and before a next change in said binary-coded signal is received, the pulse width of said refresh pulses being smaller than a minimum period of data;
   combining means, operatively connected to said delaying means and to said refresh pulse generating means, for combining said delayed binary-coded signal with said refresh pulses and for generating a combined signal, the polarity of said refresh pulses being opposite to that of said delayed binary-coded signal;
   transmitting means, operatively connected to said combining means, for transmitting said combined signal as a transmitted signal;
   second receiving means, operatively connected to said transmitting means, for receiving and passing therethrough said transmitted signal; and
   pulse-width discriminating means, operatively connected to said second receiving means, for removing said refresh pulses from said transmitted signal and for generating and transmitting a received signal so that said binary-coded signal is restored.

2. An asynchronous transmission system as set forth in claim 1, wherein said refresh pulse generating means comprises:
   a coincidence circuit, having two inputs operatively connected to said first receiving means and said delaying means, respectively, for generating a coincidence output signal having leading and trailing edges from said binary coded signal and said delayed binary coded signal;
   a resettable delay circuit, operatively connected to said coincidence circuit, for generating a reset signal having trailing edges, said resettable delay circuit being reset by the leading edges of said coincidence output signal output by said coincidence circuit with the reset operation delayed for said predetermined period of time and being set by the trailing edges of said coincidence output signal output by said coincidence circuit;
   an oscillator, operatively connected to said resettable delay circuit, for generating a rectangular wave signal of a definite frequency, said oscillator being triggered by the trailing edges of said reset signal output by said resettable delay circuit;
   a first delay circuit, operatively connected to said oscillator, for generating a delayed rectangular wave signal having first and second level polarities; and
   an inhibition gate circuit, operatively connected to said oscillator and said first delay circuit, for transmitting therethrough said rectangular wave signal output by said oscillator when the polarity of said delayed rectangular wave signal output by said first delay circuit is the first level.

3. An asynchronous transmission system as set forth in claim 2, wherein said coincidence circuit comprises an exclusive-NOR circuit.

4. A asynchronous transmission system as set forth in claim 2, wherein said resettable delay circuit comprises an odd number of NAND circuits operatively connected in series, each of said NAND circuits being a stage, wherein the first stage of said NAND circuits is operatively connected to said coincidence circuit, and the last stage of said NAND circuits has an input operatively connected to the output of said coincidence circuit and has an output operatively connected to said oscillator.

5. An asynchronous transmission system as set forth in claim 4, wherein said NAND circuits between said first and last stages comprise intermediate stages, wherein at least one intermediate stage of said NAND circuits has an input operatively connected to said coincidence circuit.

6. An asynchronous transmission system as set forth in claim 1, wherein said combining means comprises an exclusive-OR circuit.

7. An asynchronous transmission system as set forth in claim 1, wherein said pulse-width discriminating means comprises:
   a plurality of inverter circuits, operatively connected in series, having odd and even numbered inverter circuits, the first of said plurality of inverter circuits having an input operatively connected to said second receiving means to receive said transmitted signal and each having outputs, for generating inverter output signals;
   a first NAND circuit, having inputs operatively connected to the outputs of the last and at least one of said even numbered of said plurality of inverter circuits, the difference in time between said inverter output signals of said first and last of said even numbered of said plurality of inverter circuits being larger than the pulse-width of said refresh pulse and smaller than said minimum period of data, for generating a set output signal;
   a second NAND circuit, having inputs operatively connected to the outputs of the last and at least one of said odd numbered of said plurality of inverter circuits, the difference in time between said inverter output signals of said first and last of said odd numbered first inverter circuits being larger than the pulse-width of said refresh pulse and smaller than said minimum period of data, for a generating a reset output signal; and
   a flip-flop, operatively connected to said first and second NAND circuits to receive said first and second output signals, respectively, said flip-flop being set by said set output signal output by said first NAND circuit and reset by said reset output signal output by said second NAND circuit, for restoring said binary-coded signal.

8. An asynchronous transmission system as set forth in claim 1, wherein said pulse-width discriminating means comprises:

a plurality of delay circuits, operatively connected in series, each of said delay circuits having an input and an output, the input of the first of said delay circuits operatively connected to said second receiving means to receive said transmitted signal, the difference in time between the transmitted signal output by said second receiving means and a delay output signal generated by the last of said delay circuits being larger than the pulse-width of said refresh pulse and smaller than said minimum period of data;

a NAND circuit, operatively connected to said second receiving means and to the output of each of said delay circuits, having an output, for receiving said transmitted signal and for generating a reset output signal;

an OR circuit, operatively connected to said second receiving means and to the output of each of said delay circuits, having an output, for receiving said transmitted signal and for generating a set output signal; and a flip-flop, operatively connected to the output of said NAND circuit and to the output of said OR circuit, said flip-flop being set by said set output signal from said NAND circuit and reset by said reset output signal from said OR circuit, for restoring said binary-coded signal.

* * * * *

UNITED STATES PATENT AND TRADEMARK OFFICE
CERTIFICATE OF CORRECTION

PATENT NO. : 4,347,617

DATED : Aug. 31, 1982

INVENTOR(S) : Murano et al.

It is certified that error appears in the above—identified patent and that said Letters Patent is hereby corrected as shown below:

```
Column 1, line 11, delete ",";
          line 24, "a" should be --the--.
Column 4, line 35, "1(1)" should be --2(1)--.
Column 5, line 2, delete "than", second occurrence.
          line 2, "neglected" should be --ignored--.
Column 7, line 13, after "respectively" insert --,--;
          line 16, after "8(1b)" insert --,--.
Column 8, line 7, "D" (first occurrence) should be --D1--;
          line 52, after "3" insert --,--.
Column 10, line 57, delete "a".
```

Signed and Sealed this

First Day of February 1983

[SEAL]

Attest:

GERALD J. MOSSINGHOFF

Attesting Officer

Commissioner of Patents and Trademarks